US010438066B2

(12) United States Patent
Zimerman et al.

(10) Patent No.: US 10,438,066 B2
(45) Date of Patent: *Oct. 8, 2019

(54) EVALUATION OF MODELS GENERATED FROM OBJECTS IN VIDEO

(71) Applicant: Verint Americas Inc., Alpharetta, GA (US)

(72) Inventors: Gadi Zimerman, Hod-Hasharon (IL); Itsik Horovitz, Holon (IL); Shmuel Akerman, Binyamina (IL); Amir Sole, Rehovot (IL)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,178

(22) Filed: Jun. 29, 2018

(65) Prior Publication Data

US 2018/0307910 A1     Oct. 25, 2018

Related U.S. Application Data

(63) Continuation of application No. 15/048,237, filed on Feb. 19, 2016, now Pat. No. 10,032,079, which is a (Continued)

(51) Int. Cl.
*G06K 9/62* (2006.01)
*G06K 9/00* (2006.01)
(Continued)

(52) U.S. Cl.
CPC ...... *G06K 9/00711* (2013.01); *G06K 9/00342* (2013.01); *G06K 9/00348* (2013.01); *G06K 9/00369* (2013.01); *G06K 9/46* (2013.01); *G06K 9/4671* (2013.01); *G06K 9/6262* (2013.01); *G06T 7/251* (2017.01);
(Continued)

(58) Field of Classification Search
CPC ........... G06K 9/00342; G06K 9/00348; G06K 9/00369; G06K 9/00711; G06K 9/46; G06K 9/4671; G06K 9/6262; G06T 2207/10016; G06T 2207/30196; G06T 2207/30241; G06T 7/251
See application file for complete search history.

(56) References Cited

U.S. PATENT DOCUMENTS

6,188,777 B1   2/2001   Darrell et al.
6,400,831 B2   6/2002   Lee et al.
(Continued)

*Primary Examiner* — Amara Abdi
(74) *Attorney, Agent, or Firm* — Christopher M. Scherer; DeWitt LLP (57) ABSTRACT

Models are generated from objects identified in video. Each model is evaluated based on knowledge of the objects determined from video analysis, and preferred models are identified based on the evaluations. In some examples, each model could be evaluated by tracking a movement of each object in the video by using each model to track the object from which it was generated, evaluating an ability of each model to identify the objects in the video that are similar to the object from which it was generated, and determining an amount of false identifications made by each model of different objects in different video that does not include the object from which it was generated.

22 Claims, 6 Drawing Sheets

Related U.S. Application Data continuation of application No. 13/355,285, filed on Jan. 20, 2012, now Pat. No. 9,268,996.

(60) Provisional application No. 61/434,736, filed on Jan. 20, 2011.

(51) Int. Cl.
*G06K 9/46* (2006.01)
*G06T 7/246* (2017.01)

(52) U.S. Cl.
CPC ............ *G06T 2207/10016* (2013.01); *G06T 2207/30196* (2013.01); *G06T 2207/30241* (2013.01)

(56) References Cited

U.S. PATENT DOCUMENTS

| | | |
|---|---|---|
| 6,658,136 B1 | 12/2003 | Brumitt |
| 7,003,136 B1 | 2/2006 | Harville |
| 7,412,110 B1 | 8/2008 | Worthington |
| 7,424,175 B2 | 9/2008 | Lipton et al. |
| 8,116,522 B1 | 2/2012 | Buck et al. |
| 8,249,334 B2 | 8/2012 | Berliner et al. |
| 8,379,921 B1 | 2/2013 | Golan et al. |
| 8,411,080 B1 | 4/2013 | Zimmermann |
| 8,457,401 B2 | 6/2013 | Lipton et al. |
| 8,638,985 B2 | 1/2014 | Shotton et al. |
| 8,744,177 B2 | 6/2014 | Lim et al. |
| 2005/0084154 A1 | 4/2005 | Li et al. |
| 2005/0175219 A1 | 8/2005 | Yang et al. |
| 2007/0122058 A1 | 5/2007 | Kitaura et al. |
| 2008/0063236 A1 | 3/2008 | Ikenoue et al. |
| 2008/0074496 A1 | 3/2008 | Venetianer et al. |
| 2008/0123968 A1 | 5/2008 | Nevatia et al. |
| 2008/0181453 A1 | 7/2008 | Xu et al. |
| 2008/0310737 A1* | 12/2008 | Han ................ G06K 9/3241 382/224 |
| 2008/0317379 A1 | 12/2008 | Steinberg et al. |
| 2009/0141940 A1* | 6/2009 | Zhao ................ G06K 9/00295 382/103 |
| 2009/0245573 A1 | 10/2009 | Saptharishi et al. |
| 2010/0086062 A1 | 4/2010 | Pace |
| 2010/0287053 A1* | 11/2010 | Ganong ........... G06K 9/00248 705/14.66 |
| 2012/0143808 A1* | 6/2012 | Karins ................ G06N 7/005 706/46 |
| 2012/0328156 A1 | 12/2012 | Nakano et al. |
| 2013/0022261 A1 | 1/2013 | Imai et al. |

* cited by examiner

EVALUATION OF MODELS GENERATED FROM OBJECTS IN VIDEO

RELATED APPLICATIONS

This application is a continuation of U.S. patent application Ser. No. 15/048,237, filed Feb. 19, 2016, which application is a continuation of U.S. patent application Ser. No. 13/355,285, filed Jan. 20, 2012, entitled "EVALUATION OF MODELS GENERATED FROM OBJECTS IN VIDEO," and claims the benefit of U.S. provisional application entitled "DESCRIPTORS BASED OBJECT DETECTION" having Ser. No. 61/434,736 filed on Jan. 20, 2011. The disclosures of the above are incorporated herein by reference in their entireties.

TECHNICAL FIELD

Aspects of the invention are related, in general, to the field of image processing and analysis.

TECHNICAL BACKGROUND

Image analysis involves performing processes on images or video in order to identify and extract meaningful information from the images or video. In many cases, these processes are performed on digital images using digital image processing techniques. Computers are frequently used for performing this analysis because large amounts of data and complex computations may be involved. Many image processing techniques are designed to emulate recognition or identification processes which occur through human visual perception and cognitive processing.

OVERVIEW

A method of operating an image processing system is disclosed. The method comprises generating models from objects identified in video. The method further comprises evaluating each model based on knowledge of the objects determined from video analysis, and identifying at least one preferred model based on the evaluating.

In an embodiment, one or more computer readable media have stored thereon program instructions which, when executed by a processing system, direct the processing system to generate models from objects identified in video. The program instructions further direct the processing system to perform evaluations on each model based on knowledge of the objects determined from video analysis, and identify at least one preferred model based on the evaluations.

In an embodiment, an image processing system comprises a processing system. The processing system is configured to generate models from objects identified in video. The processing system is further configured to perform evaluations on each model based on knowledge of the objects determined from video analysis, and identify at least one preferred model based on the evaluations.

In an embodiment, evaluating each model based on knowledge of the objects determined from video analysis comprises tracking a movement of each object in the video.

In an embodiment, tracking the movement of each object in the video comprises using each model to track the object from which it was generated.

In an embodiment, evaluating each model based on knowledge of the objects determined from video analysis comprises evaluating an ability of each model to identify the objects in the video that are similar to the object from which it was generated.

In an embodiment, evaluating each model based on knowledge of the objects determined from video analysis comprises determining an amount of false identifications made by each model of different objects in different video that does not include the object from which it was generated.

In an embodiment, evaluating each model based on knowledge of the objects determined from video analysis comprises tracking a movement of each object in the video by using each model to track the object from which it was generated, evaluating an ability of each model to identify the objects in the video that are similar to the object from which it was generated, and determining an amount of false identifications made by each model of different objects in different video that does not include the object from which it was generated.

In an embodiment, identifying at least one preferred model based on the evaluations comprises identifying a model having a greatest ability to identify the objects in the video that are similar to the object from which it was generated and having a least amount of false identifications of the different objects in the different video.

In an embodiment, the objects are identified in the video by manual identification.

In an embodiment, the objects are identified in the video by human head detection.

In an embodiment, the objects identified in the video comprise human body parts.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Disclosed herein are systems and methods for evaluating models generated from objects identified in video. Generally, a descriptors-based detection technique is employed to detect and identify objects using one or more of an object's parts. Models of the object are generated and then portions of images in video are compared to these predetermined models. Preferred models are selected intelligently based on their ability to maximize the detection rate of similar objects while keeping false detections to a minimum.

Figure 1:
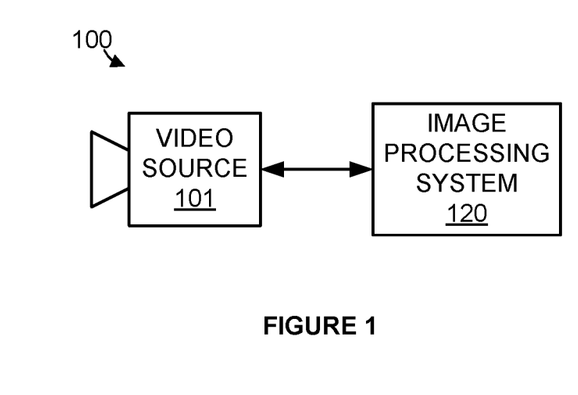
FIG. 1 is a block diagram that illustrates an imaging system.
Figure 2:
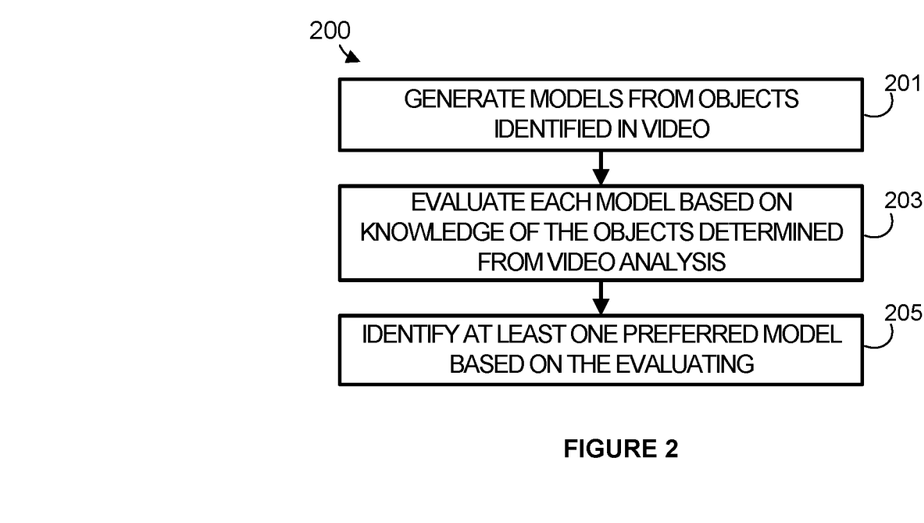
FIG. 2 is a flow diagram of a process according to an embodiment of the invention for operating an image processing system.

FIGS. 1-2 are provided to illustrate one implementation of an imaging system 100 and its operation. FIG. 1 depicts elements of imaging system 100, while FIG. 2 illustrates process 200 that describes the operation of imaging system 100.

Referring now to FIG. 1, a block diagram is shown that illustrates imaging system 100. Imaging system 100 comprises video source 101 and image processing system 120.

Video source 101 may comprise any device having the capability to capture video or images. Video source 101 comprises circuitry and an interface for transmitting video or images. Video source 101 may be a device which performs the initial optical capture of video, may be an intermediate video transfer device, or may be another type of video transmission device. For example, video source 101 may be a video camera, still camera, internet protocol (IP) camera, video switch, video buffer, video server, or other video transmission device, including combinations thereof.

Image processing system 120 may comprise any device for processing or analyzing video, video streams, or images. Image processing system 120 comprises processing circuitry and an interface for receiving video. Image processing system 120 is capable of performing one or more processes on the video streams received from video source 101. The processes performed on the video may include viewing, storing, transforming, mathematical computations, modifications, object identification, analytical processes, conditioning, other processes, or combinations thereof. Image processing system 120 may also comprise additional interfaces for transmitting or receiving video streams, a user interface, memory, software, communication components, a power supply, or structural support. Image processing system 120 may be a video analytics system, server, digital signal processor, computing system, or some other type of processing device, including combinations thereof.

Video source 101 and image processing system 120 communicate via one or more links which may use any of a variety of communication media, such as air, metal, optical fiber, or any other type of signal propagation path, including combinations thereof. The links may use any of a variety of communication protocols, such as internet, telephony, optical networking, wireless communication, wireless fidelity, or any other communication protocols and formats, including combinations thereof. The link between video source 101 and image processing system 120 may be direct as illustrated or may be indirect and accomplished using other networks or intermediate communication devices.

It should be understood that imaging system 100 may contain additional video sources, additional image processing systems, or other devices.

Turning now to FIG. 2, process 200 describes the operation of imaging system 100 in an implementation, and in particular, the operation of image processing system 120. The steps of process 200 are indicated below parenthetically.

To begin, models are generated from objects identified in video (201). In some examples, the models could be generated by scanning through the video and identifying marked locations in the video to create models of those locations. For example, the marked locations in the video could comprise objects that are identified in the video by manual identification, such as by a user manually marking the portions of the video associated with the target objects. In some examples, the objects identified in the video comprise human body parts, such as human heads. In this case, the objects could be identified in the video by human head detection and/or facial recognition, and a different model could be generated for each human head identified in the video. In yet another example, image processing system 120 could identify portions of the video that exhibit movement and identify the objects in the video that are associated with that movement. Other techniques of identifying objects in video from which to generate models are possible and within the scope of this disclosure.

Once the models are generated, each model is evaluated based on knowledge of the objects determined from video analysis (203). In some examples, to evaluate each model, image processing system 120 could analyze the video in order to track movement of each object in the video. For example, image processing system 120 could track the movement of each object in the video by using each model to track the object from which it was generated. In other words, this model evaluation technique tests the model's ability to track its associated object from which it was generated as the object moves and changes position in the video. For example, in the case of modeling human heads, a movement profile for each human could be generated based on each head model tracking the movement of its respective human through a video scene. Such tracking could provide statistics about the dynamics of the scene, such as average and maximum step size of each person, rates of speed, where most foot traffic occurs, and the like. Such motion dynamics could be stored in association with their respective models for later use in identifying different objects, such as the heads of different humans, which might appear in different video.

Additionally or alternatively, in some examples image processing system 120 could evaluate each model based on knowledge of the objects determined from video analysis by evaluating an ability of each model to identify the objects in the video that are similar to the object from which it was generated. In this evaluation, each model is tested to determine its ability to detect and identify objects that are similar to the object from which it was modeled. For example, continuing the above example of human head modeling, each head model could be evaluated against video of other humans to see which of the other humans were correctly identified using the head models from different humans. In some examples, image processing system 120 could optionally determine which head models incorrectly detected body parts other than heads and/or other non-human objects as human heads.

Additionally or alternatively, in some examples image processing system 120 could also optionally evaluate each model by determining an amount of false identifications made by each model of different objects in different video that does not include the object from which it was generated. For example, images that do not contain any objects that were used to generate the models in Step 201 could be analyzed using those models. Any detection by the models is therefore incorrect and represents a false detection. For example, in the case of human head detection, models of different heads could be compared against video that contains no images of humans whatsoever to determine if any of the models falsely identify other objects appearing in the video as human heads.

Once the models are evaluated, image processing system 120 identifies at least one preferred model based on the evaluations (205). Typically, preferred models are selected based on some criteria, such as the most general models evaluated. For example, one approach to identifying preferred models could comprise selecting the model that detected the greatest number of objects in the video that are similar to the object from which it was generated, then removing those objects that it detected from the analysis, and selecting another model that detected the next greatest number of this same type of object in the video from among the remaining objects that were undetected by the first selected model, and so on. This approach would ensure that the preferred models identified have the best ability to generalize, but also avoids resemblance and redundancy among the preferred models. In one example, identifying at least one preferred model based on the evaluations comprises identifying a model having a greatest ability to identify the objects in the video that are similar to the object from which it was generated and having a least amount of false identifications of different objects in different video. In some examples, the top five percent of the models which created the most false detections could be disqualified on the basis that they describe a feature that is too general and might be very common in most video scenes. Other techniques and criteria could be utilized to identify preferred models based on the evaluations and are within the scope of this disclosure.

Advantageously, using the above techniques, models of various objects appearing in video can be evaluated to determine preferred models that best detect similar objects in other video. The preferred models can be selected intelligently in order to maximize the detection rate while keeping false detections and the number of models to a minimum. In this manner, inferior models that are inaccurate and overly general are filtered out and eliminated so that a smaller collection of preferred, optimal models are identified and selected for use.

Figure 3:
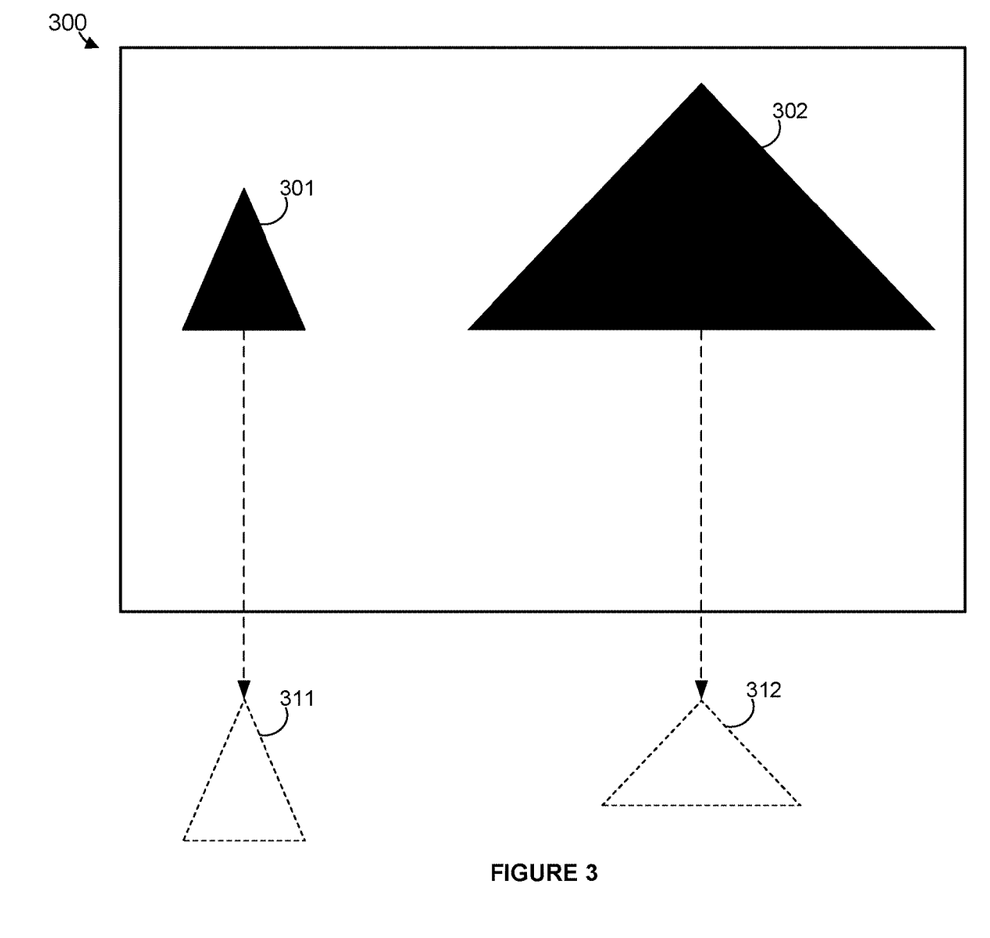
FIG. 3 is a block diagram that illustrates video and models generated from objects identified in the video.

FIG. 3 is a block diagram that illustrates video 300 and models 311 and 312 generated from objects 301 and 302 identified in the video 300. As shown in FIG. 3, the image displayed of video 300 shows two triangle objects labeled 301 and 302. Although basic, two-dimensional shapes are used herein for the purpose of clarity, one of skill in the art will understand that much more complex objects appearing in video could be modeled, including three-dimensional objects and portions of larger objects, such as body parts of a human being, for example.

The objects 301 and 302 have associated models 311 and 312, respectively, that are generated from the objects 301 and 302 identified in the video. In this example, a user has previously marked objects 301 and 302 in video 300 by designating the area in the video 300 in which the objects 301 and 302 appear in order to identify the objects 301 and 302 in the video 300, but other object identification techniques are possible. Based on the objects 301 and 302 identified in the video 300, respective models 311 and 312 have been generated. As shown by the dashed arrows in FIG. 3, model 311 corresponds to object 301, and model 312 corresponds to object 302.

Figure 4:
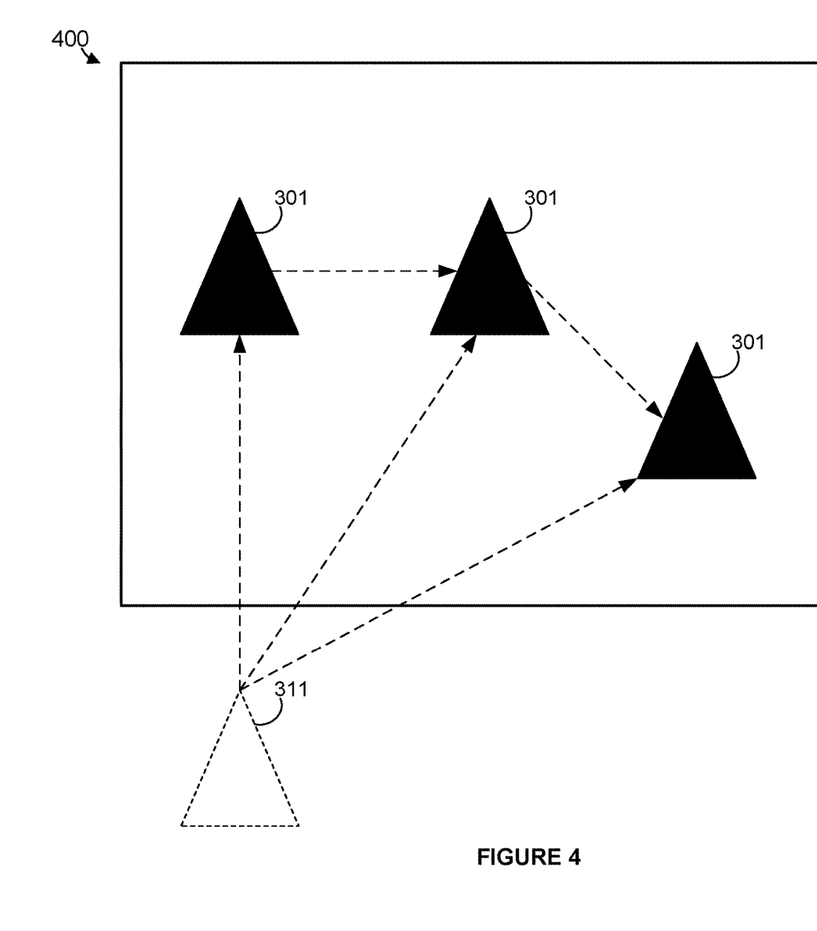
FIG. 4 is a block diagram that illustrates video and an evaluation of a model based on knowledge of an object in the video.

FIG. 4 is a block diagram that illustrates video 400 and an evaluation of a model 311 based on knowledge of an object 301 in the video 400. In this example, video 400 depicts a scene in which triangle object 301 is traveling in motion. Model 311, which was generated from object 301 previously based on video 300 of FIG. 3, is used to track the movement of object 301 throughout the video scene 400. In other words, triangle object 301 is being detected and tracked using its own model 311. In this example, model 311 successfully tracks the movement of object 301 from which it was generated.

Figure 5:
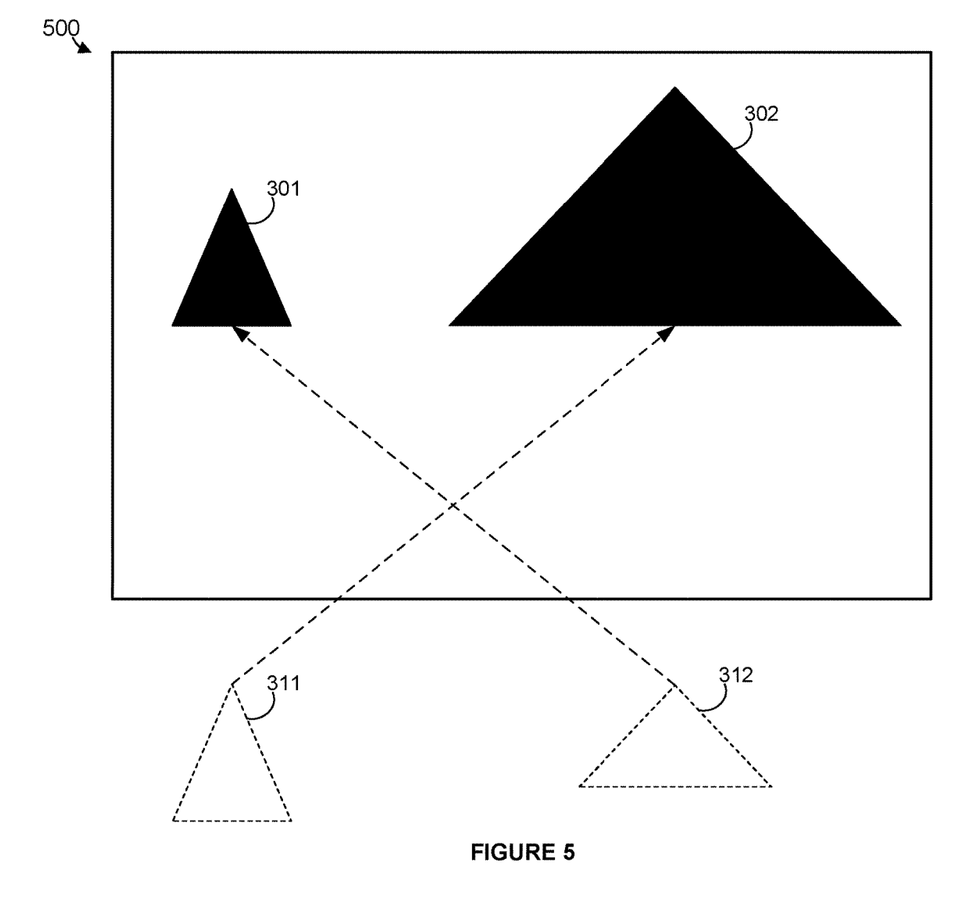
FIG. 5 is a block diagram that illustrates video and an evaluation of models based on knowledge of objects in the video.

FIG. 5 is a block diagram that illustrates video 500 and an evaluation of models 311 and 312 based on knowledge of objects 301 and 302 in the video 500. This evaluation tests the ability of each model 311 and 312 to detect and identify objects 302 and 301 that are similar to the objects 301 and 302 that were used to generate their respective models 311 and 312. For example, since model 311 was generated from triangle object 301, model 311 is evaluated to determine its ability to detect similar triangle object 302 in video 500. Likewise, triangle model 312 was modeled after triangle object 302, so the ability of model 312 to detect similar triangle object 301 is tested.

In this example, each model 311 and 312 successfully identifies a similar object 302 and 301, respectively. Thus, as shown by the dashed arrows on FIG. 5, model 311 correctly identifies triangle object 302 that is similar to triangle object 301 from which model 311 was generated. Likewise, model 312 accurately identifies triangle object 301 that is similar to triangle object 302 from which model 312 was generated.

Figure 6:
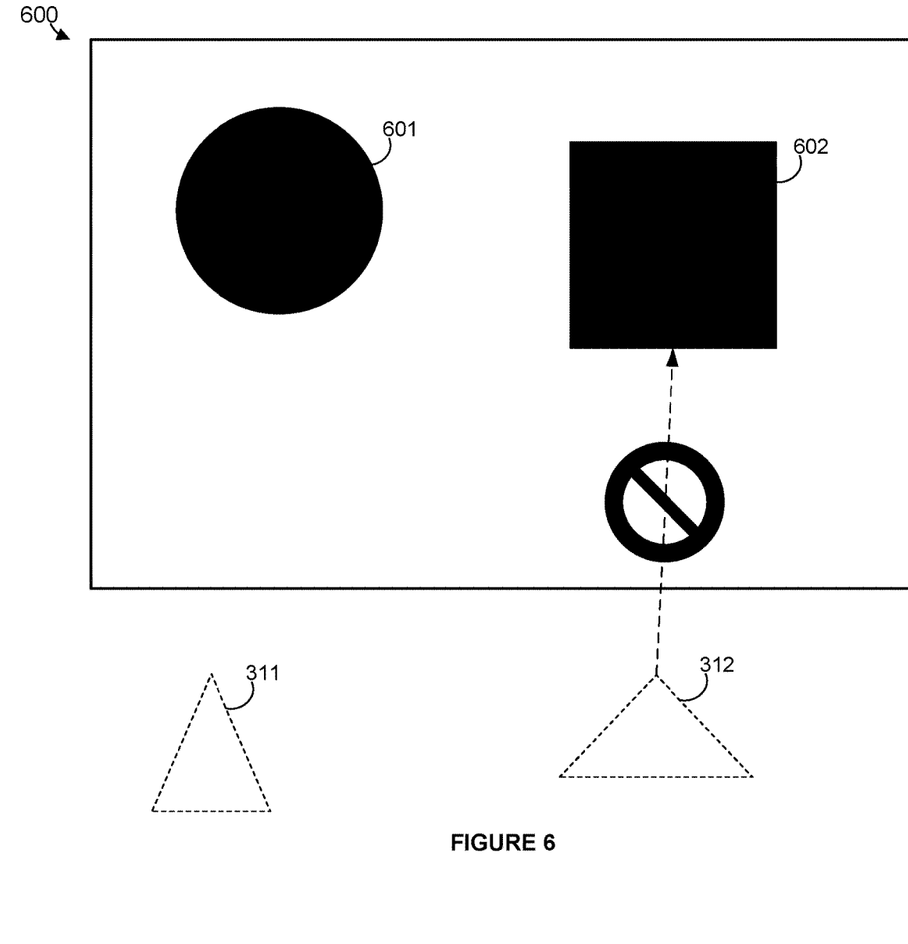
FIG. 6 is a block diagram that illustrates video and an evaluation of models based on knowledge of objects in the video.

FIG. 6 is a block diagram that illustrates video 600 and an evaluation of models 311 and 312 based on knowledge of objects 601 and 602 in the video 600. In this example, although both models 311 and 312 were modeled after triangle objects 301 and 302 as discussed above with respect to FIG. 3, the image in the video 600 does not contain any triangle objects. Instead, video 600 contains a circular object 601 and a square object 602. Models 311 and 312 are thus evaluated against the scene in video 600 to determine if either model 311 or 312 falsely identifies one of the objects 601 or 602 as a triangle object.

In this example, model 311 successfully avoids falsely identifying either object 601 or 602 as a triangle object. However, as shown in FIG. 6, model 312 falsely identifies the square object 602 as a triangle object. Since video 600 is known to not contain any triangle objects whatsoever, the detection of object 602 by model 312 is incorrect and represents a false detection. Such information could be subsequently used to identify preferred models, such as by eliminating model 312 for being too generalized and instead selecting model 311 for its superior ability to avoid false detections.

Figure 7:
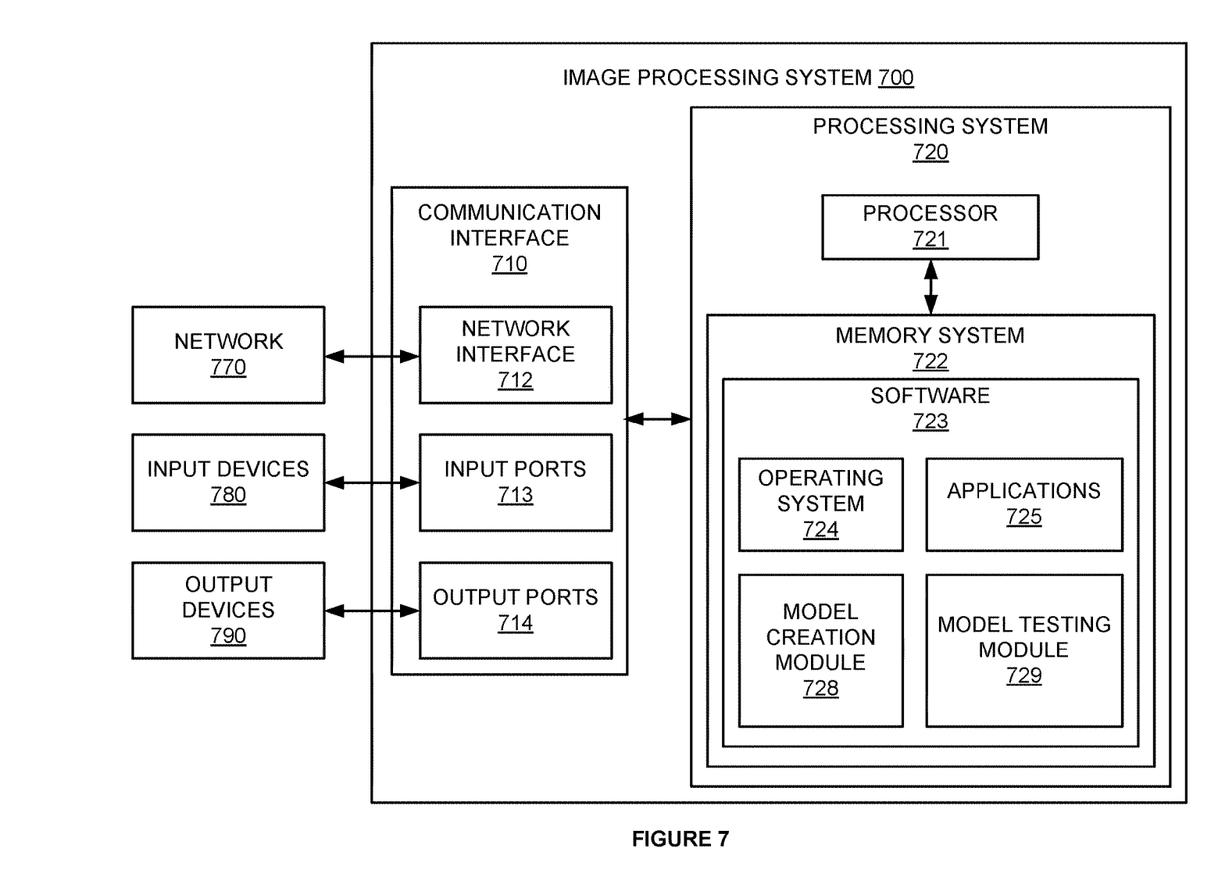
FIG. 7 is a block diagram that illustrates an image processing system.

FIG. 7 illustrates image processing system 700. Image processing system 700 provides an example of image processing system 120, but image processing system 120 could have alternative configurations. Image processing system 700 and the associated description below are intended to provide a brief, general description of a suitable computing environment in which process 200 of FIG. 2 may be implemented. Many other configurations of computing devices and software computing systems may be employed to implement process 200.

Image processing system 700 may be any type of computing system capable of evaluating models generated from objects identified in video, such as a client computer, server computer, internet apparatus, or any combination or variation thereof. Image processing system 700 may be implemented as a single computing system, but may also be implemented in a distributed manner across multiple computing systems. Image processing system 700 is provided as an example of a general purpose computing system that, when implementing process 200, becomes a specialized system capable of evaluating models generated from objects identified in video and identifying preferred models based on the evaluations.

Image processing system 700 includes communication interface 710 and processing system 720. Processing system 720 and communication interface 710 are in communication through a communication link. Processing system 720 includes processor 721 and memory system 722. Memory system 722 stores software 723, which, when executed by processing system 720, directs image processing system 700 to operate as described herein for process 200.

Communication interface 710 includes network interface 712, input ports 716, and output ports 718. Communication interface 710 includes components that communicate over communication links, such as network cards, ports, RF transceivers, processing circuitry and software, or some other communication device. Communication interface 710 may be configured to communicate over metallic, wireless, or optical links. Communication interface 710 may be configured to use TDM, IP, Ethernet, optical networking, wireless protocols, communication signaling, or some other communication format, including combinations thereof. Image processing system 700 may include multiple network interfaces.

Network interface 712 is configured to connect to external devices over network 770. Network interface 712 may be configured to communicate in a variety of protocols. Input ports 716 are configured to connect to input devices 780 such as a video source, a storage system, a keyboard, a mouse, a user interface, or other input device. Output ports 718 are configured to connect to output devices 790 such as a storage system, other communication links, a display, or other output devices.

Processing system 720 includes processor 721 and memory system 722. Processor 721 includes microprocessor or other circuitry that retrieves and executes operating software from memory system 722. Processor 721 may comprise a single device or could be distributed across multiple devices—including devices in different geographic areas. Processor 721 may be embedded in various types of equipment.

Memory system 722 may comprise any storage media readable by processing system 720 and capable of storing software 723, including operating system 724, applications 725, model creation module 728, and model testing module 729. Memory system 722 may include volatile and nonvolatile, removable and non-removable media implemented in any method or technology for storage of information, such as computer readable instructions, data structures, program modules, or other data. Memory system 722 may comprise a single device or could be distributed across multiple devices—including devices in different geographic areas. Memory system 722 may be embedded in various types of equipment. Memory system 722 may comprise additional elements, such as a controller, capable of communicating with processing system 720.

Examples of storage media include random access memory, read only memory, magnetic disks, optical disks, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal or carrier wave.

Software 723, including model creation module 728 and model testing module 729 in particular, comprises computer program instructions, firmware, or some other form of machine-readable processing instructions having process 200 embodied therein. Model creation module 728 and model testing module 729 may be implemented as a single application but also as multiple applications. Model creation module 728 and model testing module 729 may be stand-alone applications but may also be implemented within other applications distributed on multiple devices, including but not limited to program application software and operating system software.

In general, software 723 may, when loaded into processing system 720 and executed, transform processing system 720, and image processing system 700 overall, from a general-purpose computing system into a special-purpose computing system customized to evaluate models generated from objects identified in video and identify preferred models based on the evaluations as described by process 200 and its associated discussion.

Software 723, and model creation module 728 and model testing module 729 in particular, may also transform the physical structure of memory system 722. The specific transformation of the physical structure may depend on various factors in different implementations of this description. Examples of such factors may include, but are not limited to, the technology used to implement the storage media of memory system 722, whether the computer-storage media are characterized as primary or secondary storage, and the like.

For example, if the computer-storage media are implemented as semiconductor-based memory, software 723, and model creation module 728 and model testing module 729 in particular, may transform the physical state of the semiconductor memory when the software is encoded therein. For example, software 723 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

Software 723 comprises operating system 724, applications 725, model creation module 728, and model testing module 729. Software 723 may also comprise additional computer programs, firmware, or some other form of non-transitory, machine-readable processing instructions. When executed by processing system 720, operating software 723 directs processing system 720 to operate image processing system 700 as described herein for image processing system 120 and process 200. In particular, operating software 723 directs processing system 720 to generate models from objects identified in video. Operating software 723 also directs processing system 720 to perform evaluations on each model based on knowledge of the objects determined from video analysis. Further, operating software 723 directs processing system 720 to identify at least one preferred model based on the evaluations.

In this example, operating software 723 comprises a model creation software module 728 that generates models from objects identified in video. Additionally, operating software 723 comprises a model testing software module 729 that performs evaluations on each model based on knowledge of the objects determined from video analysis and identifies at least one preferred model based on the evaluations.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an image processing system, the method comprising:
   generating a plurality of respective models from identified objects in a first video, wherein said plurality of respective models include descriptors of parts of said identified objects;
   evaluating an ability of each of the plurality of respective models to identify other objects in a second video when said other objects are similar to a respective identified object from which said plurality of respective models was generated; and
   identifying at least one preferred model from the plurality of respective models based on the evaluating step.

2. The method of claim 1 wherein evaluating an ability of each respective model comprises evaluating knowledge of the objects determined from video analysis of tracked movement of said respective identified object in the second video.

3. The method of claim 1 wherein evaluating an ability of each respective model comprises evaluating knowledge of the objects comprising a number of false identifications made by each model of different objects in different video that does not include the respective identified object from which the respective model was generated.

4. The method of claim 3 wherein the respective models that have a high rate of false identifications are removed from being identified as the at least one preferred model.

5. The method of claim 4 wherein the models determined to have a high rate of false identifications are those ranking in the top 5% of false identifications from the plurality of respective models.

6. The method of claim 1 wherein evaluating each model comprises evaluating knowledge of the identified objects determined from a video analysis that comprises:
   tracking a movement in the video by using each respective model to track the respective identified object from which it was generated; and
   determining an amount of false identifications made by each respective model of different objects in the first video that may include the object from which it was generated.

7. The method of claim 1 wherein identifying at least one preferred model based on the evaluating comprises identifying one of the respective models having a greatest ability to identify the other objects in the second video that are similar to the respective identified object from which the one of the respective models was generated and having a least amount of false identifications of different objects in the first video.

8. The method of claim 1 wherein the identified objects are identified in the first video by manual identification.

9. The method of claim 1 wherein the identified objects are identified in the first video based on movement detection.

10. The method of claim 1 wherein the identified objects are identified in the first video by human head detection.

11. The method of claim 10 wherein the identified objects in the first video comprise human heads.

12. The method of claim 11 wherein a different model is generated for each different identified human head.

13. The method of claim 1 wherein the identified objects identified in the first video comprise human body parts.

14. A method of image processing, comprising:
   generating a plurality of respective models from identified objects in a first video;
   evaluating an ability of each of the plurality of respective models to identify other objects from a second video when said other objects are similar to a respective identified object from which said respective model was generated and distinguish different objects from the first video when said first video includes said other objects that are similar; and
   identifying at least one preferred model from the plurality of respective models based on the evaluating step.

15. The method of claim 14 further comprising performing the evaluations on each respective model based on knowledge of the respective identified objects determined from video analysis and further tracking a movement of each respective identified object in the first video.

16. The method of claim 15 further comprising performing the evaluations on each respective model based on knowledge of the identified objects determined from video analysis and evaluating an ability of each respective model to identify, from the portions of the second video, other objects in the second video that are similar to the identified object from which the respective model was generated.

17. The method of claim 15 further comprising performing the evaluations on each respective model based on knowledge of the objects determined from video analysis and determining an amount of false identifications made by each respective model of said different objects in the first video that includes the identified object from which the respective model was generated.

18. The method of claim 17 wherein the respective models with a high rate of false identifications are removed from being identified as the at least one preferred model.

19. The method of claim 18 wherein the models determined to have a high rate of false identifications are those ranking in the top 5% of false identifications from the plurality of respective models.

20. The method of claim 14 wherein the identified objects are identified in the first video by manual identification.

21. The method of claim 14 wherein the identified objects are identified in the first video based on movement detection, and wherein the identified objects in the first video comprise objects associated with the identified movement.

22. The method of claim 14 wherein the identified objects are identified in the first video by human head detection, and wherein the identified objects in the first video comprise human heads, further wherein a different model is generated for each different identified human head.

* * * * *